United States Patent Office 3,290,284
Patented Dec. 6, 1966

3,290,284
NOVEL GLYCOSIDES OF DESOSAMINE
Howard Newman, Spring Valley, N.Y., assignor to American Cyanamid Company, Stamford, Conn., a corporation of Maine
No Drawing. Filed Jan. 5, 1965, Ser. No. 423,589
9 Claims. (Cl. 260—210)

This invention relates to novel organic compounds and, more particularly, is concerned with novel glycosides of desosamine which may be represented by the following general formula:

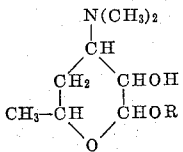

wherein R is β-naphthyl, β-anthraquinonyl, cyclododecyl, cholesteryl, 2-digitogeninyl or 3-digitogeninyl. The present invention also relates to the quaternary ammonium salts of these novel glycosides of desosamine if prepared with alkyl halides such as, for example, methyl iodide, ethyl bromide, iso-propyl chloride, etc.

The free bases of the novel glycosides of desosamine of the present invention are, in general, high melting crystalline solids, somewhat soluble in polar solvents such as methanol, ethanol, chloroform, acetone and dimethylformamide; but relatively insoluble in non-polar solvents such as ether, petroleum ether, and the like.

The quaternary ammonium salts of the novel glycosides of desosamine of the present invention are, in general, white crystalline solids soluble in water and methanol, but relatively insoluble in solvents such as benzene, toluene, ethyl acetate, acetone and the like.

The novel glycosides of desosamine of the present invention form acid-addition salts with a variety of organic and inorganic salt-forming agents. Thus, acid-addition salts formed by admixture of the free base with an acid, suitably in a methanol solvent, are formed with such acids as sulfuric, phosphoric, hydrochloric, hydrobromic, and the like. For purposes of this invention the free bases are equivalent to their acid-addition salts.

The novel glycosides of desosamine of the present invention are useful as herbicides, fungicides, bactericides and/or nematocides. For example, cyclododecyl desosaminide and β-anthraquinonyl desosaminide were incorporated in 1.5% water agar at a concentration of approximately 500 p.p.m. This agar-chemical mixture was poured into a number of small bottles and permitted to solidify. Seeds of wheat, corn, radish, and cucumber were placed on the surface of the solidified agar, one species per bottle, and 2 ml. of water added to facilitate germination. The bottles were covered for two days then the covers removed and the bottles permitted to stand at room temperature for one week. Seeds and plants were observed periodically following treatment and water was added as required. At the end of the week it was found that both compounds had killed all plant species in tests. Cyclododecyl desosaminide was also found to be effective at a concentration of approximately 100 p.p.m. in controling spore germination of the fungus organisms Monilinia fructicola, Stemphylium sarcinaeforme, and Aspergillus niger. In the tests, spore suspensions of said organisms in deionized water with a small amount of orange juice added to facilitate germination were placed in opticlear vials with sufficient test chemicals added to provide approximately 100 p.p.m. concentration. The vials were stoppered, placed on a tumbler, and rotated for 24 hours. When the exposure period was terminated, the vials were removed from the tumbler and examined macroscopically. In all instances inhibition of spore germination resulted. Similarly, in bactericidal tests cyclododecyl desosaminide was found effective at the approximate concentration of 100 p.p.m. in controlling the bacterial organisms Aerobacter aerogenes, Staphylococcus aureas, and Xanthomonas vesicatoria. Likewise, it was found that 1,000 p.p.m. of cyclododecyl desosaminide is effective in controlling the test nematode vinegar eelworm, Turbatrix aceti.

The invention will be described in greater detail in conjunction with the following specific examples.

EXAMPLE 1

Preperation of ethyl desosaminide

A solution of 135 g. (0.18 mole) of erythromycin in 1.5–2 liters of absolute ethanol is heated under reflux for two and one-half hours with hydrogen chloride bubbling through the solution. The ethanol is removed in vacuo, the black residue dissolved in chloroform, and the chloroform solution extracted twice with water. The combined aqueous extracts are washed with chloroform, basified (pH~12) with cold 10% sodium hydroxide, and the precipitated oily material extracted into chloroform. The chloroform solution is dried and evaporated, and the orange liquid residue distilled in vacuo; 22.4 g. (60%) of ethyl desosaminide is obtained, B.P. 73–80° C. (0.5 mm.).

EXAMPLE 2

Preperation of ethyl O,N-dicarbethoxydes-N-desosaminide

A mixture of 1 g. (0.005 mole) of ethyle desosaminide and 2 g. of anhydrous sodium carbonate in 10 cc. (0.1 mole) of ethyl chloroformate is stirred at room temperature for nineteen hours. The pale yellow reaction mixture is poured into chloroform, the chloroform solution filtered to remove the suspended solid, and the filtrate evaporated in vacuo. The evaporation is repeated twice more with fresh portions of chloroform to remove all the ethyl chloroformate. The pale yellow residue is dissolved in chloroform and the solution washed with water, dried, and evaporated. The yellow residue is molecularly distilled to yield 0.32 g. (30%) of a viscous, colorless liquid, B.P. 75–85° C. (heating block) (0.025 mm.).

EXAMPLE 3

Preparation of ethyl O,N-dicarbethoxydes-N-methyldesosaminide

To a mixture of 10 cc. (0.1 mole) of ethyl chloroformate (commercial grade) and 10 cc. of acetone (commercial grade dried over magnesium sulfate) is added 2 g. (0.019 mole) of anhydrous sodium carbonate and 2.5 g. (0.017 mole) of sodium iodide. The mixture is cooled, and 1 g. (0.005 mole) of ethyl desosaminide is added. The reaction mixture is stirred in the dark at room temperature (flask is enveloped with aluminum foil) for sixty-eight hours, poured into chloroform, and the inorganic material removed by washing with water. The organic phase is dried and evaporated and the residue molecularly distilled to yield 1.56 g. (94%) of ethyl O,N - dicarbethoxydes-N-methyldesosaminide, B.P. 85–95° C. (heating block) (0.025 mm.).

EXAMPLE 4

Preparation of ethyl des-N-methyldesosaminide

To a solution of 1.3 g. (0.004 mole) of ethyl O,N-dicarbethoxydes-N-methyldesosaminide in 5 cc. of ethanol is added 6 cc. of 20% aqueous sodium hydroxide. The resulting two-phase system is heated under reflux for five hours, cooled, and poured into methylene chloride. More water is added and the aqueous phase thoroughly extracted with methylene chloride. The} methylene chloride extracts are dried and evaporated. The white solid obtained melts at 100–112° C.; yield 0.6 g. (80%). The analytical sample is prepared by recrystallization from acetone; M.P. 119–120.5° C.

In another preparation (~70 g. of the dicarbethoxy derivative) the ethanol is removed in vacuo before extracting with methylene chloride, and the solid residue obtained on evaporation is purified by washing with petroleum ether.

Ethyl desosaminide is converted to the des-N-methyl derivative, M.P. 102–113° C., in 78% yield by hydrolyzing the crude dicarbethoxy derivative directly.

EXAMPLE 5

*Preparation of ethyl O,N-ditrifluoroacetyldes-N-methyldesosaminide*

To a partial solution of 1 g. (0.0052 mole) of ethyl des-N-methyldesosaminide in 15 cc. of anhydrous ether, is added 6 g. (0.07 mole) of sodium carbonate. The mixture is cooled (ice-water) and vigorously stirred, and 8 cc. of trifluoroacetic anhydride is added at as rapid a rate as possible without the reaction getting out of control (~five minutes). The cooling bath is removed and the vigorous stirring continues for twenty minutes. The reaction mixture is poured into chloroform, the excess anhydride destroyed with ice, and the chloroform solution washed with water, dried, and evaporated. The yellow liquid residue is distilled in vacuo to yield 1.5 g. (75%) of ethyl O,N - ditrifluoroacetyldes - N - methyldesosaminide as a colorless, fairly viscous liquid, B.P. 83–85° C.

In another run (10 g. of ethyl des-N-methyldesosaminide), the chloroform-water system emulsifies and it is found desirable to extract the ditrifluoroacetyl derivative with ether.

EXAMPLE 6

*Preparation of 2-O-trifluoroacetyl-3-N-methyl trifluoroacetamido-3,4,6-trideoxy-glucosyl bromide*

A solution of 0.7 g. (0.0018 mole) of ethyl O,N-ditrifluoroacetyldes-N-methyldesosaminide in 2 cc. of 32% hydrogen bromide in acetic acid containing 0.25 cc. acetic anhydride is kept at room temperature for two hours, then evaporated to dryness in vacuo at 25–40° C. The pasty solid residue is crystallized from boiling petroleum ether. The hygroscopic, white crystalline solid obtained is kept under vacuum over potassium hydroxide; yield, 0.45 g. (59%), M.P. 73–77° C.

The workup is modified as follows in the conversion of 5 g. of the ethyl glycoside: The crude residue obtained by evaporating the reaction mixture is heated in boiling petroleum ether and the petroleum ether quickly decanted from a reddish lower liquid phase. The extraction is repeated twice more with fresh portions of petroleum ether. The petroleum ether extracts are evaporated at atmospheric pressure on the steam bath, the last traces of solvent being removed in a stream of nitrogen. The white crystalline product is kept under vacuum over potassium hydroxide overnight at room temperature. 4.5 g. (83%) of product, M.P. 63–72° C., is obtained.

EXAMPLE 7

*Preparation of cholesteryl des-N-methyldesosaminide*

To a solution of 1.9 g. (0.005 mole) of cholesterol in 60 cc. of 1,2-dichloroethane is added 1.3 g. (0.0052 mole) of mercuric cyanide and 2 g. of Drierite. The suspension is stirred at room temperature for one hour, 2.1 g. (0.005 mole) of the bromosugar added, and the mixture stirred for twenty-three hours at room temperature. The insoluble salts are removed by filtration, chloroform added to the filtrate, and the organic solution washed with water, dried, and evaporated. The residue is twice taken up in petroleum ether and evaporated to yield 3.6 g. of an off-white solid, M.P. 147–152° C. which is hydrolyzed directly by heating a suspension of the material in a mixture of 50 cc. of methanol and 50 cc. of 10% sodium hydroxide at reflux for ¾ hour. The methanol is removed in vacuo, water added and the organic product extracted with ether. The ether extracts are washed, dried, and evaporated, and the residue washed with petroleum ether (to remove unreacted cholesterol) to yield 1.2 g. of a white solid, M.P. 146–152° C. A suspension of the solid in methanol is heated to boiling, cooled, and collected. 1.1 g. (42% from the bromosugar) of cholesteryl des-N-methyldesosaminide is obtained, M.P. 151–156° C. (the cloudy melt clears at 165° C.), $[\alpha]_D^{25}$: +29° (C, 1.01, chloroform), AgIR 10842.

Evaporation of the petroleum ether extract leaves 0.65 g. of solid residue, M.P. 133–145° C., which contains a considerable amount of cholesterol as indicated by micro thin-layer chromatography in benzene-ethyl acetate, 2:1

The glycosidation could also be effected in chloroform in the presence of silver oxide; however, the yield is inferior and the experimental procedure more complicated.

EXAMPLE 8

*Preparation of cholesteryl desosaminide*

A solution of 2.5 g. (0.0047 mole) of cholesteryl des-N-methyldesosaminide and 0.95 g. (0.0065 mole) of chloral (prepared by distillation from a mixture of equal weights of chloral hydrate and concentrated sulfuric acid) in 40 cc. of chloroform evaporated. The residue is triturated with petroleum ether and the petroleum ether evaporates. The off-white, somewhat sticky formyl derivative, $$\lambda_{max}^{Nujol} \ 2.80, \ 5.91 \text{ and } 6.02\mu$$

is reduced with an excess of lithium aluminum hydride (0.5 g., 0.013 mole) in refluxing ether for sixteen hours. The excess hydride is destroyed with ethyl acetate; ice, followed by 10% sodium hydroxide (to dissolve the precipitated aluminum hydroxide), is added to the ethereal solution, and the aqueous phase extracted twice with ether and once with chloroform. The combined organic extracts are washed, dried, and evaporated to yield 1.9 g. (75%) of a white solid M.P. 146–154° C. A 0.1 g. suspension of this material is heated in boiling methanol, cooled, and collected. 0.085 g. of compound, M.P. 152–155° C. is recovered.

EXAMPLE 9

*Preparation of cyclodecyl des-N-methyldesosaminide*

To a solution of 0.184 g. (0.001 mole) of cyclodecanol in 50 cc. of 1,2-dichloroethane (dried over calcium chloride for twenty-four hours, then distilled) is added 0.3 g. (0.0012 mole) of mercuric cyanide (kept over phosphorous pentoxide at 56° C. overnight) and 1 g. of pulverized predried calcium sulfate. The suspension is stirred at room temperature for one hour, 0.42 g. (0.001 mole) of 2-O-trifluoroacetyl-3-N-methyl trifluoroacetamido-3,4,6-trideoxyglucosyl bromide added, and the mixture stirred for twenty-six hours at room temperature. The insoluble salts are removed by filtration, chloroform added to the filtrate, and the organic solution washed with water, dried and evaporated to yield 0.55 g. of a greenish-yellow syrup, $$\lambda_{max}^{neat} \ 5.59\mu \text{ and } 5.90\mu$$

which is hydrolyzed directly by stirring in 14 cc. of a 7% solution of potassium carbonate in aqueous methanol (2:5 v./v.) at room temperature for four and one-half hours. The reaction mixture is poured into water and the organic product extracted with ether. The 0.3 g. of viscous yellow syrup obtained by drying and evaporating the ether absorbs in the 3μ region in the infrared and shows no absorption at 5.6 and 5.9 mμ. Evaporative distillation of the crude product in ca. 110° C. (0.005 mm.) yields 0.15 g. (46%) of a very viscous syrup.

EXAMPLE 10

*Preparation of cyclododecyl desosaminide*

As previously described, cyclododecyl des-N-methyl desosaminide is N-formylated with chloral in refluxing chloroform

[AgIR 15,656 $\lambda_{max.}^{neat}$ 6.02$\mu$ (strong)]

and the formyl derivative reduced to cyclododecyl desosaminide (syrup) with excess lithium aluminum hydride in refluxing ether.

EXAMPLE 11

*Preparation of β-naphthyl desosaminide*

To a solution of 0.45 g. (0.0017 mole) of desosamine diacetate and 0.27 g. (0.0019 mole) of β-naphthol (M.P. 122–123° C.) in 25 cc. of anhydrous benzene is added 1.5 cc. of boron trifluoride etherate (47% practical grade). The reaction mixture is shaken mechanically for 17 hours, partitioned between water and methylene chloride and the unreacted β-naphthol washed out with 2 N sodium hydroxide solution. The organic phase is washed with saturated salt solution, dried, and evaporated, to yield 0.5 g. of a pale brown syrup, $\lambda_{max.}^{neat}$ 5.71$\mu$ (ester), 6.12, 6.23 and 6.6$\mu$ (aromatic triplet)

which is hydrolyzed directly by keeping in 5 cc. of methanolic sodium methoxide (a small chip of sodium is added to a solution of the compound in methanol) for five hours. The reaction mixture was poured into water, the organic product extracted with methylene chloride, and the methylene chloride extracts washed, dried and evaporated to yield 0.4 g. (82%), of a pale yellow syrup which is molecularly distilled at 100–120° C. (0.005 mm.). The distillate (0.39 g.) which collects on the cold finger of the molecular still consists partly of a brittle glass and partly of an immobile colorless syrup.

Methiodide 0.175 g. of the glycoside is converted to its methiodide by allowing it to react with an excess of methyl iodide in 2 cc. of acetone for one hour. The white crystalline solid which separates is collected and washed with acetone. Yield, 0.9 g., M.P. 222–225° C. dec. After heating a suspension of the compound in boiling acetone, it melts at 223–225° C. dec.

The syrupy residue (5 g.) obtained in a larger scale run (840–58) is converted to its hydrochloride salt by treating an ethereal solution of the compound with ethereal hydrogen chloride. After drying at 100° C. in vacuo for 2–3 hours the hydrochloride (5 g.) melts at 100–122° C. (frothy melt).

EXAMPLE 12

*Preparation of β-anthraquinonyl desosaminide*

The highly insoluble 2-hydroxyanthraquinone (0.5 g., 0.0022 mole) is suspended in a solution of 0.5 g. (0.0019 mole) of desosamine diacetate in 60 cc. of methylene chloride (dried over molecular sieves), 1.5 cc. of boron trifluoride etherate (47% practical grade) is added, and the resulting reaction mixture shaken mechanically for twenty-two and one-quarter hours. The reaction mixture is worked up as described for β-naphthyl desosaminide. The 0.65 g. of crude acetylated glycoside is hydrolyzed directly by stirring in 15 cc. of methanolic sodium methoxide for six and one-half hours, the reaction mixture being worked up as described for β-naphthyl desosaminide. The dark syrup obtained is extracted with three portions of boiling ether and the ether extracts charcoaled and evaporated to yield an orange-yellow syrup. The addition of petroleum ether-ether to a suspension of the material in a very small amount of methanol renders it solid, M.P. 123–130° C.; yield, 0.1 g. (14%). After heating in boiling ether, in which the compound appears to be only sparingly soluble, and keeping overnight at room temperature, the straw colored solid obtained melts at 149–154° C., unchanged from that of the material before the ether purification.

EXAMPLE 13

*Preparation of 2- and 3-digitogeninyl des-N-methyl-desosaminide*

Mercuric cyanide (1.3 g., 0.0051 mole) and pulverized anhydrous calcium sulfate (2 g.) are added to digitogenin (2.24 g., 0.005 mole) in 75 ml. of 1,2-dichloroethane. To this suspension is added 2-O-trifluoroacetyl-3-N-methyl trifluoroacetamido-3,4,6-trideoxyglucosyl bromide (2.1 g., 0.005 mole) and the mixture stirred at room temperature for 24 hours. Removal of the insoluble salts by filtration, washing the dichloroethane solution with water, and drying the organic layer and removing it under vacuum leaves a residue, which is hydrolyzed by heating under reflux for one-half hour in a mixture of 50 ml. of methanol and 50 ml. of 10% sodium hydroxide. The methanol is removed under vacuum, water added, and the aqueous solution extracted three times with chloroform. Drying the chloroform extracts over magnesium sulfate and evaporating yields the white solid product as a mixture of the des-N-methyldesosaminides of digitogenin joined to the 2- or 3-position of digitogenin.

EXAMPLE 14

*Preparation of 2- and 3-digitogeninyl desosaminide*

The mixture of 2- and 3-digitogeninyl des-N-methyldesosaminides (2 g.) described in Example 13 is heated under reflux for 16 hours with 0.8 g. of chloral in 50 ml. of chloroform. Evaporation yields the N-formyl derivative, which is reduced with 0.5 g. of lithium aluminum hydride in refluxing ether for 16 hours. After destroying excess hydride with ethyl acetate, ice, followed by 10% sodium hydroxide, is added to the ether. The layers are separated and the aqueous phase extracted twice with chloroform. Drying (magnesium sulfate) and evaporation of the combined organic extracts yields a mixture of 2- and 3-digitogeninyl desosaminides as a solid melting over a wide range.

What is claimed is:

1. A compound selected from the group consisting of glycosides of desosamine of the formula:

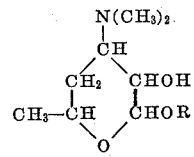

wherein R is selected from the group consisting of β-naphthyl, β-anthraquinonyl, cyclododecyl, cholesteryl, 2-digitogeninyl and 3-digitogeninyl; the acid-addition salts thereof; and the quaternary ammonium salts thereof with lower alkyl halides.

2. Cholesteryl desosaminide.
3. Cyclododecyl desosaminide.
4. β-Naphthyl desosaminide.
5. β-Anthraquinonyl desosaminide.
6. 2-digitogeninyl desosaminide.
7. 3-digitogeninyl desosaminide.
8. β-Naphthyl desosaminide methiodide.
9. β-Naphthyl desosaminide hydrochloride.

No references cited.

LEWIS GOTTS, *Primary Examiner.*

JOHNNIE R. BROWN, *Assistant Examiner.*